United States Patent
Sung

(12) 
(10) Patent No.: US 10,981,492 B1
(45) Date of Patent: Apr. 20, 2021

(54) APPARATUS AND METHOD FOR CONTROLLING BEAM PATTERN OF HEAD LAMP FOR VEHICLE

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/817,377

(22) Filed: Mar. 12, 2020

(30) Foreign Application Priority Data

Sep. 30, 2019 (KR) .................. 10-2019-0120571

(51) Int. Cl.
  *B60Q 1/08* (2006.01)
  *B60Q 1/00* (2006.01)

(52) U.S. Cl.
  CPC .......... *B60Q 1/085* (2013.01); *B60Q 1/0023* (2013.01); *B60Q 2300/45* (2013.01)

(58) Field of Classification Search
  CPC ... B60Q 1/085; B60Q 1/0023; B60Q 2300/45
  See application file for complete search history.

(56) References Cited

U.S. PATENT DOCUMENTS

| 9,278,644 | B2* | 3/2016 | Lee | B60Q 1/143 |
| 10,317,034 | B2* | 6/2019 | Tessnow | F21S 41/663 |
| 2016/0368413 | A1* | 12/2016 | Nishii | F21S 41/36 |
| 2017/0182931 | A1* | 6/2017 | Son | B60Q 1/143 |

FOREIGN PATENT DOCUMENTS

| JP | 2013-067288 A | 4/2013 |
| JP | 2014-184851 A | 10/2014 |
| JP | 2015-143065 A | 8/2015 |
| KR | 10-2015-0052638 A | 5/2015 |

OTHER PUBLICATIONS

Office Action of Korean Patent Application No. 10-2019-0120571—6 pages (dated Dec. 1, 2020).

* cited by examiner

*Primary Examiner* — Borna Alaeddini
(74) *Attorney, Agent, or Firm* — Knobbe Martens Olson & Bear LLP

(57) ABSTRACT

An apparatus for controlling a beam pattern of a head lamp for a vehicle, comprising: an object detection unit configured to detect an object ahead of a vehicle; an ADB (Adaptive Driving Beam) head lamp configured to emit a matrix beam according to a beam pattern; a vehicle state input unit configured to receive an ADB operation state; and a control unit configured to calculate the width of a dark zone corresponding to the object and a boundary section around the dark zone according to the object detection result from the object detection unit, and then drive the ADB head lamp according to the ADB operation state.

14 Claims, 4 Drawing Sheets

APPARATUS AND METHOD FOR CONTROLLING BEAM PATTERN OF HEAD LAMP FOR VEHICLE

CROSS-REFERENCE TO RELATED APPLICATION

The present application claims priority to Korean Patent Application No. 10-2019-0120571 filed on Sep. 30, 2019 in the Korean Intellectual Property Office, which is incorporated herein by reference in its entirety.

BACKGROUND

1. Technical Field

Embodiments of the present disclosure relate to an apparatus and method for controlling a beam pattern of a head lamp for a vehicle, and more particularly, to an apparatus and method for controlling a beam pattern of a head lamp for a vehicle, which can prevent glare to a driver in an opposite vehicle by turning off lights for an area corresponding to the opposite vehicle using the masking principle of an ADB (Adaptive Driving Beam) head lamp, and flash on and off lights for a boundary section around a pedestrian or wild animal when the pedestrian or wild animal is detected, such that the pedestrian or wild animal can recognize the approach of the vehicle while glare to the pedestrian or wild animal is prevented.

2. Related Art

In general, a vehicle includes a lighting system which provides a lighting function of enabling a driver to see objects in the driving direction during driving at night and a function of informing other vehicles or other road users of the driving state of the vehicle. Here, the head lamp which is also referred to as a headlight is a light which functions to illuminates the road ahead of the vehicle.

The beam emitted from the head lamp is adjusted in such a manner that a part of the beam on the side close to the centerline has low brightness. According to the recent regulations, the beam emission direction of the head lamp needs to be adjusted to reduce the amount of beam emitted to a driver in a vehicle traveling in the opposite direction, in order to prevent glare of the driver.

Thus, an ADB (Adaptive Driving Beam) head lamp has been introduced to improve forward recognitions of a driver in an ego vehicle and a driver in a vehicle traveling in the opposite direction. That is, the ADB head lamp is a light emitting device that emits light while changing the lighting angle, brightness, width and length of the lamp.

The ADB head lamp may adjust the brightness of the head lamp to prevent glare to a driver in a vehicle approaching in the opposite lane (hereafter, referred to as 'opposite vehicle').

That is, a vehicle with the ADB head lamp travels with a high beam when there are no opposite vehicles, and changes the beam pattern to an L-shape beam pattern when an opposite vehicle appears. Also, the vehicle forms a dark zone using a swivel actuator, in order to prevent glare to a driver in the opposite vehicle. Then, the vehicle returns the beam pattern to the high beam after the opposite vehicle passes.

The related art of the present disclosure is disclosed in Korean Patent Application Laid-Open 10-2015-0052638 published on May 14, 2015 and entitled "ADB Headlamp System and Beam Control Method Using the Same".

The head lamp system separately includes a plurality of optical modules which are installed on a side of the headlamp to provide a spot light function. According to the spot light function, when an obstacle is found during driving at night, the head lamp system turns on an optical module corresponding to the area where the obstacle is present, and illuminates the obstacle such that a driver can recognize the presence of the obstacle.

In this way, the head lamp system may prevent glare to a driver in an opposite vehicle through the ADB head lamp which can turn off only some of the optical modules. Furthermore, the head lamp system has a function of not only emitting light to an obstacle such that a driver can easily recognize a pedestrian, but also informing the pedestrian of the presence of the vehicle by causing glare to the pedestrian, like a spot light.

However, in order to provide the ADB head lamp and the spot light function, the head lamp system needs to additionally include the separate optical modules.

In the case of the spot light, the head lamp system needs to raise the brightness of the light to enhance the recognition of the driver. In this case, however, the spot light may not only cause inconvenience to a driver in an opposite vehicle with severe glare, but also cause an unexpected and threatening behavior of a wild animal.

SUMMARY

Various embodiments are directed to an apparatus and method for controlling a beam pattern of a head lamp for a vehicle, which can prevent glare to a driver in an opposite vehicle by turning off lights for an area corresponding to the opposite vehicle using the masking principle of an ADB (Adaptive Driving Beam) head lamp, and flash on and off lights for a boundary section around a pedestrian or wild animal when the pedestrian or wild animal is detected, such that the pedestrian or wild animal can recognize the approach of the vehicle while glare to the pedestrian or wild animal is prevented.

In an embodiment, an apparatus for controlling a beam pattern of a head lamp for a vehicle may include: an object detection unit configured to detect an object ahead of a vehicle; an ADB head lamp configured to emit a matrix beam according to a beam pattern; a vehicle state input unit configured to receive an ADB operation state; and a control unit configured to calculate the width of a dark zone corresponding to the object and a boundary section around the dark zone according to the object detection result from the object detection unit, and then drive the ADB head lamp according to the ADB operation state.

The control unit may calculate the dark zone width by adding a margin to position information of the object.

The control unit may calculate the boundary section using distance information of the object based on the dark zone width corresponding to the object.

When a plurality of objects are detected, the control unit may calculate the dark zone width and the boundary section by adding up dark zone widths and boundary sections corresponding to the objects, respectively.

When the ADB is being operated, the control unit may turn off lights for the dark zone, and then flash off and on lights for the boundary section.

When the ADB is not being operated, the control unit may flash on and off lights for the boundary section.

In an embodiment, a method for controlling a beam pattern of a head lamp for a vehicle may include: receiving, by a control unit, an object detection result from an object detection unit; calculating, by the control unit, the width of a dark zone corresponding to the object and a boundary section around the dark zone according to the detection result of the object; receiving, by the control unit, an ADB operation state; and driving, by the control unit, an ADB head lamp based on the dark zone and the boundary section according to the ADB operation state.

In the calculating of the dark zone width and the boundary section, the control unit may calculate the dark zone width by adding a margin to position information of the object.

In the calculating of the dark zone width and the boundary section, the control unit may calculate the boundary section using distance information of the object based on the dark zone width corresponding to the object.

In the calculating of the dark zone width and the boundary section, when a plurality of objects are detected, the control unit may calculate the dark zone width and the boundary section by adding up dark zone widths and boundary sections corresponding to the objects, respectively.

In the driving of the ADB head lamp, the control unit may determine whether the ADB is being operated, and turns off lights for the dark zone and then flash off and on lights for the boundary section, when the ADB is being operated.

In the driving of the ADB head lamp, the control unit may determine whether the ADB is being operated, and flash on and off lights for the boundary section, when the ADB is not being operated.

In accordance with the embodiments of the present disclosure, the apparatus and method for controlling a beam pattern of a head lamp for a vehicle can prevent glare to a driver in an opposite vehicle by turning off lights for an area corresponding to the opposite vehicle using the masking principle of the ADB head lamp. Furthermore, when a pedestrian or wild animal is detected, the apparatus and method may flash on and off lights for the boundary section around the pedestrian or wild animal, such that the pedestrian or wild animal can recognize the approach of the vehicle while glare to the pedestrian or wild animal is prevented. In addition, the apparatus and method can implement the spot light function using the ADB head lamp, which makes it possible to reduce the number of parts.

DETAILED DESCRIPTION

Hereinafter, an apparatus and method for controlling a beam pattern of a head lamp for a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

As publicly known in the art, some of exemplary embodiments may be illustrated in the accompanying drawings from the viewpoint of function blocks, units, section, and/or modules. Those skilled in the art will understood that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in this specification. Furthermore, each of the blocks, units and/or modules may be implemented by dedicated hardware or a combination of dedicated hardware for performing some functions and a processor for performing another function (for example, one or more programmed processors and related circuits). In some exemplary embodiments, each of the blocks, units and/or modules may be physically divided into two or more blocks, units and or modules which are interactive and discrete, without departing from the scope of the disclosure. Furthermore, blocks, units and/or modules in some exemplary embodiments may be physically coupled as a more complex block, unit and/or module without departing from the scope of the disclosure.

Figure 1:
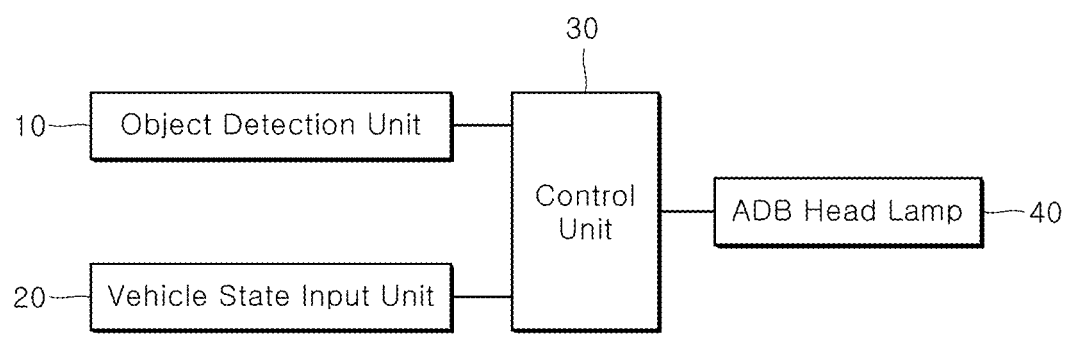
FIG. 1 is a block diagram illustrating an apparatus for controlling a beam pattern of a head lamp for a vehicle in accordance with an embodiment of the present disclosure.
Figure 2:
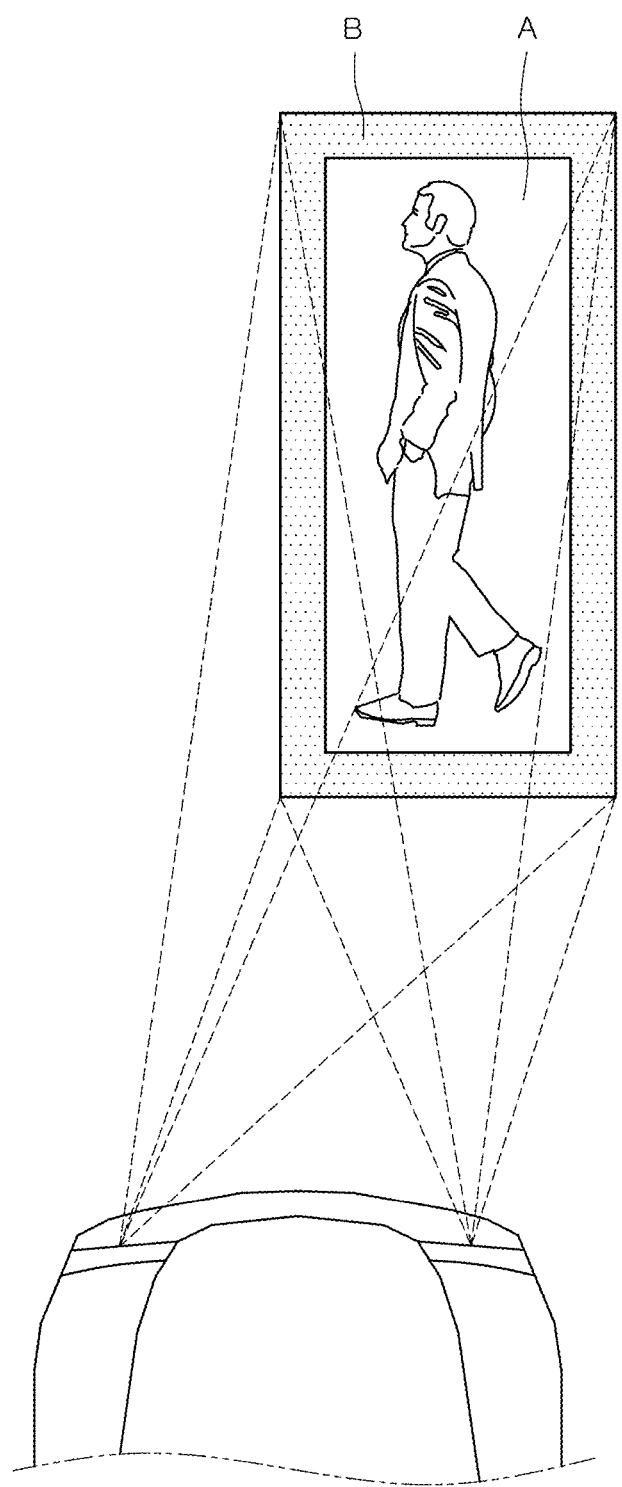
FIG. 2 is a diagram illustrating a beam pattern which is emitted by the apparatus for controlling a beam pattern of a head lamp for a vehicle in accordance with the embodiment of the present disclosure while an ADB (Adaptive Driving Beam) is operated.
Figure 3:
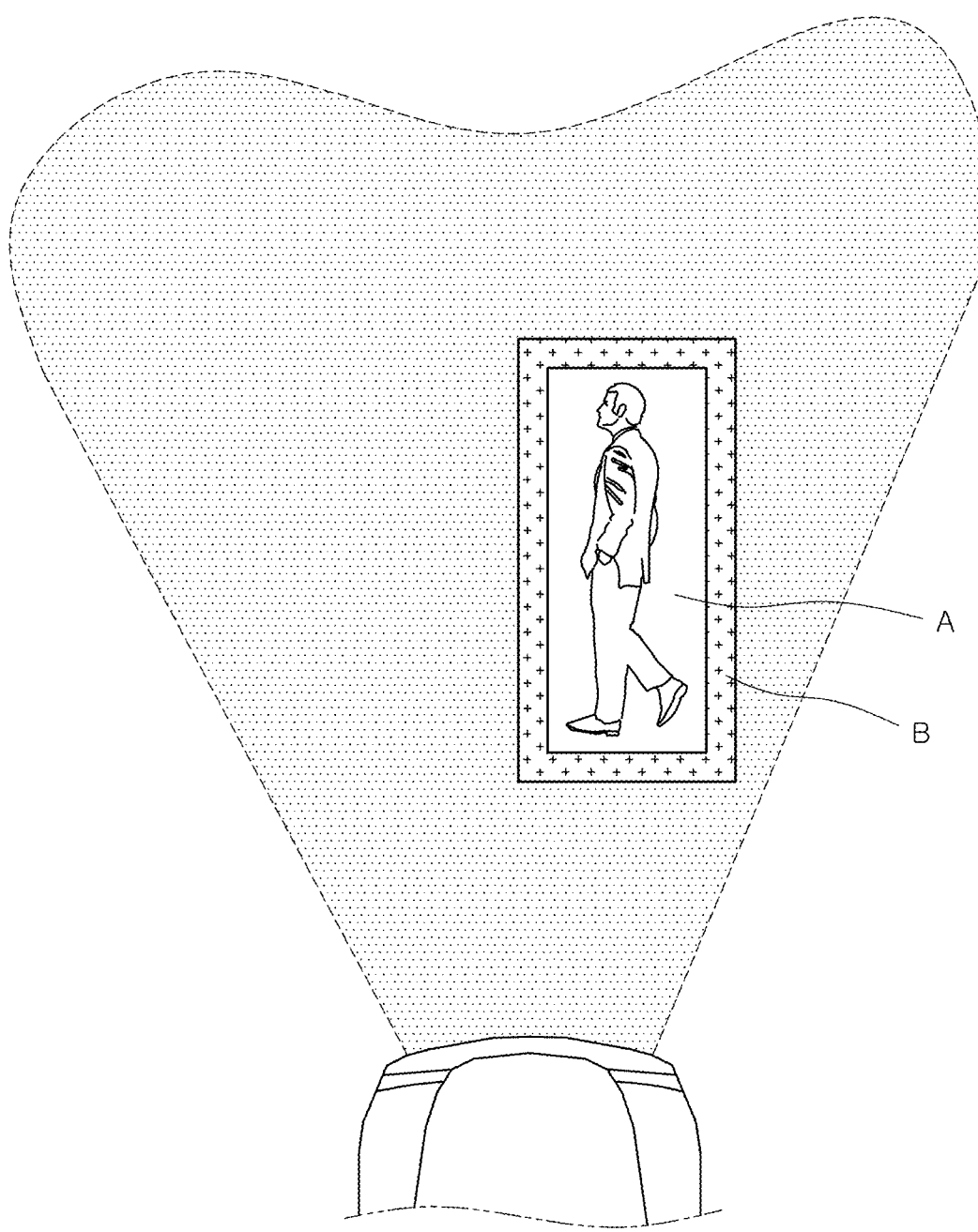
FIG. 3 is a diagram illustrating a beam pattern which is emitted by the apparatus for controlling a beam pattern of a head lamp for a vehicle in accordance with the embodiment of the present disclosure while the ADB is not operated.

FIG. 1 is a block diagram illustrating an apparatus for controlling a beam pattern of a head lamp for a vehicle in accordance with an embodiment of the present disclosure, FIG. 2 is a diagram illustrating a beam pattern which is emitted by the apparatus for controlling a beam pattern of a head lamp for a vehicle in accordance with the embodiment of the present disclosure while an ADB (Adaptive Driving Beam) is operated, and FIG. 3 is a diagram illustrating a beam pattern which is emitted by the apparatus for controlling a beam pattern of a head lamp for a vehicle in accordance with the embodiment of the present disclosure while the ADB is not operated.

As illustrated in FIG. 1, the apparatus for controlling a beam pattern of a head lamp for a vehicle in accordance with the embodiment of the present disclosure may include an object detection unit 10, an ADB head lamp 40, a vehicle state input unit 20 and a control unit 30.

The object detection unit 10 may detect an object ahead of a vehicle, and provide the detection result to the control unit 30.

The object detection unit 10 may detect position information and distance information of the object through an optical camera or IR camera. At this time, when the object is detected through a plurality of sensors, the object detection unit 10 may detect the position and distance of the object by merging the pieces of position information and distance information sensed through the respective sensors.

The ADB head lamp 40 may emit a matrix beam according to a beam pattern, and thus selectively turn on/off lights for a desired area.

The vehicle state input unit 20 may receive the operation state of the ADB and provide the received operation state to the control unit 30. Thus, the ADB function may be added through a single optical system, in order to perform a spot light function. The vehicle state input unit 20 may receive the operation state of the ADB through CAN (Controller Area Network) communication within the vehicle. The vehicle state input unit 20 may be a communication unit.

The control unit 30 may calculate the width of a dark zone corresponding to the object and a boundary section around the dark zone according to the object detection result from the object detection unit 10, and then drive the ADB head lamp to perform the spot light function depending on the operation state of the ADB.

The control unit 30 may calculate the width of the dark zone by adding a margin to the position information of the object. At this time, when a plurality of objects are detected, the control unit 30 may calculate the width of the dark zone by adding up dark zone widths corresponding to the respective objects.

The control unit 30 may calculate the boundary section around the dark zone using the distance information of the object based on the dark zone width corresponding to the object. Even at this time, when a plurality of objects are detected, the control unit 30 may calculate the boundary section by adding up boundary sections corresponding to the respective objects.

At this time, the angle of the width between lights which are turned on and off in the boundary section may be calculated as a value which is inversely proportional to the distance.

After calculating the dark zone width and the boundary section corresponding to the object according to the object detection result, the control unit 30 may receive the operation state of the ADB from the vehicle state input unit 20, and determine that the ADB head lamp 40 is already switched to the high beam, when the ADB is operated.

Therefore, as illustrated in FIG. 2, the control unit 30 may turn off lights for a dark zone A corresponding to the object and flash off and on lights for a boundary section B, such that the driver can recognize a pedestrian or wild animal while glare to the pedestrian or wild animal is prevented.

When the ADB is not operated, the ADB head lamp 40 is turned off. Therefore, the control unit 30 may flash on and off lights for the boundary section B around the dark zone A as illustrated in FIG. 3, in order to prevent glare to a pedestrian or wild animal while the pedestrian or wild animal can recognize the approach of the vehicle. Furthermore, the control unit 30 may enable the driver to recognize the pedestrian or wild animal.

As described above, the apparatus for controlling a beam pattern of a head lamp for a vehicle in accordance with the embodiment of the present disclosure can prevent glare to a driver in an opposite vehicle by turning off lights for an area corresponding to the opposite vehicle using the masking principle of the ADB head lamp. Furthermore, when a pedestrian or wild animal is detected, the apparatus may flash on and off lights for the boundary section around the pedestrian or wild animal, such that the pedestrian or wild animal can recognize the approach of the vehicle while glare to the pedestrian or wild animal is prevented. In addition, the apparatus can implement the spot light function using the ADB head lamp, which makes it possible to reduce the number of parts.

Figure 4:
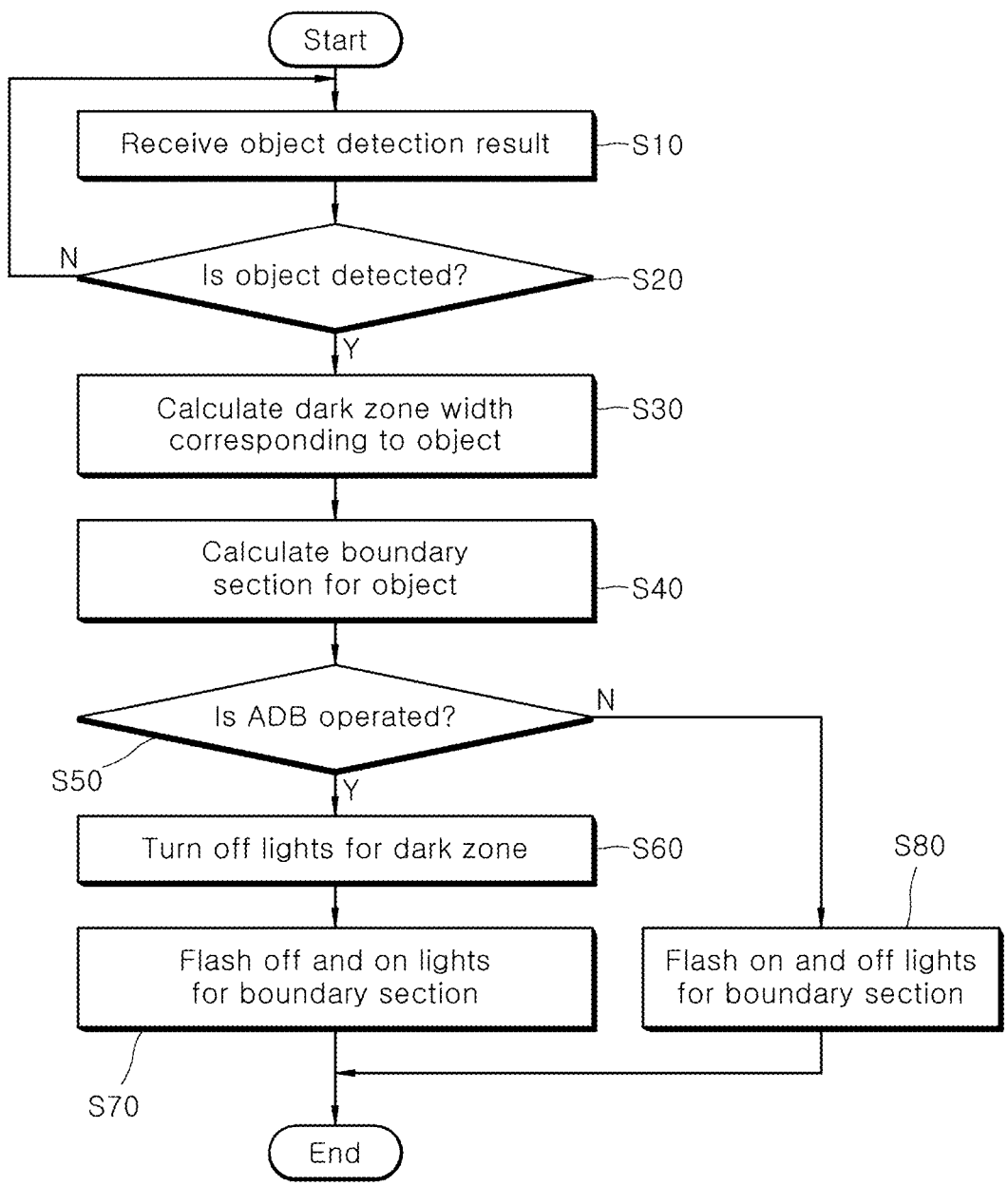
FIG. 4 is a flowchart for describing a method for controlling a beam pattern of a head lamp for a vehicle in accordance with an embodiment of the present disclosure.

FIG. 4 is a flowchart for describing a method for controlling a beam pattern of a head lamp for a vehicle in accordance with an embodiment of the present disclosure.

As illustrated in FIG. 4, the method for controlling a beam pattern of a head lamp for a vehicle in accordance with the embodiment of the present disclosure starts with step S10 in which the control unit 30 receives an object detection result from the object detection unit 10.

The object detection result may include position information and distance information of the object detected through an optical camera or IR camera of the object detection unit 10. When the object is detected through a plurality of sensors, the object detection result may include plural pieces of position information or distance information which are sensed by the respective sensors and then merged.

After receiving the object detection result in step S10, the control unit 30 may determine whether the object is detected, in step S20.

In the present embodiment, the object may include a pedestrian or wild animal.

When the detection result of step S20 indicates that no object is detected, the control unit 30 returns to step S10 to receive an object detection result.

On the other hand, when the detection result of step S20 indicates that an object is detected, the control unit 30 calculates the width of a dark zone corresponding to the object in step S30.

The control unit 30 may calculate the dark zone width by adding a margin to the position information of the object. At this time, when a plurality of objects are detected, the control unit 30 may calculate the dark zone width by adding up dark zone widths corresponding to the respective objects.

After calculating the dark zone width corresponding to the object in step S30, the control unit 30 may calculate a boundary section around the dark zone in step S40.

Here, the control unit 30 may calculate the boundary section using the distance information of the object based on the dark zone width corresponding to the object. Even at this time, when a plurality of objects are detected, the control unit 30 may calculate the boundary section by adding up boundary sections corresponding to the respective objects.

The angle of the width between lights which are turned on and off in the boundary section may be calculated as a value which is inversely proportional to the distance.

After calculating the boundary section in step S40, the control unit 30 receives the operation state of the ADB from the vehicle state input unit 20, and determines whether the ADB is being operated, in step S50.

When the determination result of step S50 indicates that the ADB is being operated, the control unit 30 determines that the ADB head lamp 40 is already switched to the head lamp, and turns off lights for the dark zone A corresponding to the object as illustrated in FIG. 2, in step S60. Then, the control unit 30 may flash off and on lights for the boundary section B such that the driver can recognize the pedestrian or wild animal while glare to the pedestrian or wild animal is prevented, in step S70.

On the other hand, when the determination result of step S50 indicates that the ADB is not being operated, the control unit 30 may determine that the ADB head lamp 40 is turned off, and flash on and off lights for the boundary section around the dark zone, such that the pedestrian or wild animal can recognize the approach of the vehicle while glare to the pedestrian or wild animal is prevented, and the driver can also recognize the pedestrian or wild animal, in step S80.

As described above, the method for controlling a beam pattern of a head lamp for a vehicle in accordance with the embodiment of the present disclosure can prevent glare to a driver in an opposite vehicle by turning off lights for an area corresponding to the opposite vehicle using the masking principle of the ADB head lamp. Furthermore, when a pedestrian or wild animal is detected, the method may flash on and off lights for the boundary section around the pedestrian or wild animal, such that the pedestrian or wild animal can recognize the approach of the vehicle while glare to the pedestrian or wild animal is prevented. In addition, the method can implement the spot light function using the ADB head lamp, which makes it possible to reduce the number of parts.

The embodiments described in this specification may be implemented with a method or process, a device, a software program, a data stream or a signal, for example. Although the embodiments have been discussed in the context of a single implementation (for example, only in a method), the discussed features can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling a beam pattern of a head lamp for a vehicle, comprising:
   an object detection unit configured to detect a pedestrian ahead of the vehicle;
   the head lamp configured to emit a matrix beam; and
   a control unit configured to:
   define a dark zone based on position information of the pedestrian from the object detection unit, wherein the dark zone includes a pedestrian-detected area corresponding to the pedestrian and a margin surrounding the pedestrian-detected area,
   define a boundary section surrounding both of the pedestrian-detected area and the margin of the dark zone, and
   control the head lamp to cause one or more lights of the head lamp corresponding to the dark zone to be turned off and to cause one or more lights of the head lamp corresponding to the boundary section to be flashed on and off such that the head lamp prevents glare to the pedestrian while still allowing the vehicle's approach to be recognized by the pedestrian.

2. The apparatus of claim 1, wherein the control unit is configured to calculate the boundary section using distance information of the pedestrian.

3. The apparatus of claim 1, wherein when a plurality of pedestrians are detected, the control unit is configured to define the dark zone by adding up individual dark zones corresponding to the plurality of pedestrians, respectively.

4. The apparatus of claim 1, wherein the head lamp is an adaptive driving beam (ADB) head lamp, wherein the control unit is further configured to:
   determine that an ADB function of the ADB head lamp is in operation; and
   in response to determining that the ADB function is in operation, control the ADB head lamp to cause the one or more lights corresponding to the dark zone to be turned off and then to cause the one or more lights corresponding to the boundary section to be flashed on and off.

5. The apparatus of claim 1, wherein the head lamp is an ADB head lamp, wherein the control unit is further configured to:
   determine that an ADB function of the ADB head lamp is not in operation; and
   in response to determining that the ADB function is not in operation, control the ADB head lamp to keep the one or more lights corresponding to the dark zone turned off and to cause the one or more lights corresponding to the boundary section to be flashed on and off.

6. The apparatus of claim 1, wherein when a plurality of pedestrians are detected, the control unit is configured to define the boundary section by adding up individual boundary sections corresponding to the plurality of pedestrians, respectively.

7. The apparatus of claim 1, wherein the control unit is further configured to control the head lamp to cause one or more lights of the head lamp corresponding to the boundary section to be flashed on and off while one or more lights of the head lamp corresponding to the dark zone maintains turned off.

8. A method for controlling a beam pattern of a head lamp for a vehicle, comprising:
   receiving, by a control unit, a detection result of a pedestrian from an object detection unit;
   defining, by the control unit, a dark zone based on position information of the pedestrian from the object detection unit, wherein the dark zone includes a pedestrian-detected area corresponding to the pedestrian and a margin surrounding the pedestrian-detected area;
   define a boundary section surrounding both of the pedestrian-detected area and the margin of the dark zone; and
   driving, by the control unit, the head lamp to cause one or more lights of the head lamp corresponding to the dark zone to be turned off and to cause one or more lights of the head lamp corresponding to the boundary section to be flashed on and off such that the head lamp prevents glare to the pedestrian while still allowing the vehicle's approach to be recognized by the pedestrian.

9. The method of claim 8, wherein, when defining the dark zone, the control unit calculates the boundary section using distance information of the pedestrian.

10. The method of claim 8, wherein when a plurality of pedestrians are detected, the control unit defines the dark zone by adding up individual dark zones corresponding to the plurality of pedestrians, respectively.

11. The method of claim 8, wherein the head lamp is an ADB head lamp, wherein the method further comprises:
    determining that an ADB function of the ADB head lamp is in operation; and
    in response to determining that the ADB function is in operation, controlling the ADB head lamp to cause the one or more lights corresponding to the dark zone to be turned off and then to cause the one or more lights corresponding to the boundary section to be flashed on and off.

12. The method of claim 8, wherein the head lamp is an ADB head lamp, wherein the method further comprises:
    determining that an ADB function of the ADB head lamp is not in operation; and
    in response to determining that the ADB function is not in operation, controlling the ADB head lamp to keep the one or more lights corresponding to the dark zone turned off and to cause the one or more corresponding to the boundary section to be flashed on off.

13. The method of claim 8, wherein when a plurality of pedestrians are detected, the control unit defines the boundary section by adding up individual boundary sections corresponding to the plurality of pedestrians, respectively.

14. The method of claim 8, wherein the head lamp is controlled to cause one or more lights of the head lamp corresponding to the boundary section to be flashed on and off while one or more lights of the head lamp corresponding to the dark zone maintains turned off.

* * * * *